United States Patent
Nazari et al.

(10) Patent No.: US 12,149,588 B2
(45) Date of Patent: Nov. 19, 2024

(54) CLOUD DEFINED STORAGE

(71) Applicant: NVIDIA CORPORATION, Santa Clara, CA (US)

(72) Inventors: Siamak Nazari, Mountain View, CA (US); Sahba Etaati, Los Gatos, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 17/802,488

(22) PCT Filed: Feb. 26, 2021

(86) PCT No.: PCT/US2021/019998
§ 371 (c)(1),
(2) Date: Aug. 25, 2022

(87) PCT Pub. No.: WO2021/174063
PCT Pub. Date: Sep. 2, 2021

(65) Prior Publication Data
US 2023/0112764 A1    Apr. 13, 2023

Related U.S. Application Data

(60) Provisional application No. 62/983,251, filed on Feb. 28, 2020.

(51) Int. Cl.
*H04L 67/1097*    (2022.01)
(52) U.S. Cl.
CPC ............................. *H04L 67/1097* (2013.01)

(58) Field of Classification Search
CPC ............ H04N 21/25833; G06F 9/5044; G06F 9/5055; G06F 3/0665; G06F 3/0631; G06F 3/0629
See application file for complete search history.

(56) References Cited

U.S. PATENT DOCUMENTS 5,860,137 A * 1/1999 Raz ..................... G06F 13/4256
714/6.13
8,156,163 B1 * 4/2012 Hamilton ............... G06F 3/0635
715/255

(Continued)

FOREIGN PATENT DOCUMENTS

CN        107329704 A  * 11/2017  ............ G06F 3/0611
CN        108228076 B  * 10/2020  ............ G06F 12/10

(Continued)

*Primary Examiner* — Shean Tokuta
(74) *Attorney, Agent, or Firm* — Hogan Lovells US LLP

(57) ABSTRACT

Storage processing units or SPUs (120) operate backend storage (150) to provide scalable storage services, redundancy, and disaster recovery to an enterprise. Each SPU (120) may reside in a host server (110) and may include an processor domain (490) with backup power (440) and isolation from a host domain (480) to allow the SPU (120) to operate after the host (110) fails or otherwise stops providing power. A cloud-based management system (180) may assess the storage needs of the enterprise, identify a storage style suited to the enterprise, and direct the SPUs (120) to create virtual volumes (122, 124, 128) having characteristics according to the storage style identified. The cloud based management system (180) may eliminate the need for the enterprise to have expertise in storage management.

10 Claims, 3 Drawing Sheets

(56) References Cited

U.S. PATENT DOCUMENTS

| | | | |
|---|---|---|---|
| 8,935,493 B1* | 1/2015 | Dolan | G06F 3/0649 |
| | | | 711/161 |
| 9,335,949 B1* | 5/2016 | Palekar | G06F 3/0683 |
| 9,830,088 B2* | 11/2017 | Chandrashekar | G06F 12/0868 |
| 10,268,593 B1* | 4/2019 | Olson | G06F 3/067 |
| 10,318,178 B1* | 6/2019 | Feng | G06F 3/065 |
| 10,353,634 B1* | 7/2019 | Greenwood | G06F 3/0665 |
| 11,340,837 B1* | 5/2022 | Vohra | G06F 3/0605 |
| 2004/0054849 A1* | 3/2004 | Deenadhayalan | G06F 11/1076 |
| | | | 711/112 |
| 2007/0260842 A1* | 11/2007 | Faibish | G06F 3/061 |
| | | | 711/170 |
| 2008/0028143 A1* | 1/2008 | Murase | G06F 11/3433 |
| | | | 711/170 |
| 2008/0086618 A1* | 4/2008 | Qi | G06F 3/0635 |
| | | | 711/170 |
| 2008/0104339 A1* | 5/2008 | Nakagawa | G06F 3/0653 |
| | | | 711/170 |
| 2009/0172347 A1* | 7/2009 | Jokura | G06F 3/0607 |
| | | | 711/E12.001 |
| 2009/0271485 A1* | 10/2009 | Sawyer | G06F 3/061 |
| | | | 709/206 |
| 2010/0082900 A1* | 4/2010 | Murayama | G06F 3/0608 |
| | | | 711/E12.001 |
| 2011/0078343 A1* | 3/2011 | Resch | G06F 11/1076 |
| | | | 710/33 |
| 2011/0225466 A1* | 9/2011 | Resch | G06F 11/1076 |
| | | | 711/170 |
| 2012/0124312 A1* | 5/2012 | Vemuri | G06F 3/067 |
| | | | 711/E12.001 |
| 2012/0137065 A1* | 5/2012 | Odenwald | G06F 3/0635 |
| | | | 711/E12.001 |
| 2012/0166751 A1* | 6/2012 | Matsumoto | G06F 3/067 |
| | | | 711/170 |
| 2013/0339786 A1* | 12/2013 | Samanta | G06F 11/2089 |
| | | | 714/E11.127 |
| 2015/0180714 A1 | 6/2015 | Chunn et al. | |
| 2015/0254126 A1 | 9/2015 | Wood et al. | |
| 2016/0019317 A1* | 1/2016 | Pawar | G06F 16/128 |
| | | | 707/649 |
| 2017/0195420 A1* | 7/2017 | Resch | G06F 3/0623 |
| 2019/0286326 A1* | 9/2019 | Pabon | G06F 3/067 |
| 2020/0042175 A1* | 2/2020 | Ogusu | G06F 3/0683 |
| 2021/0224161 A1 | 7/2021 | Wang et al. | |
| 2021/0224236 A1 | 7/2021 | Wang et al. | |
| 2021/0240369 A1* | 8/2021 | Cain | G06F 3/0679 |
| 2021/0318824 A1* | 10/2021 | Cain | G06F 3/0644 |
| 2021/0405902 A1* | 12/2021 | Sangle | G06F 3/067 |
| 2023/0112764 A1* | 4/2023 | Nazari | H04L 67/1097 |
| | | | 709/219 |
| 2023/0273799 A1* | 8/2023 | DeJong | G06F 9/4403 |
| | | | 713/2 |

FOREIGN PATENT DOCUMENTS

| | | | | |
|---|---|---|---|---|
| CN | 112104597 A | * | 12/2020 | G06F 8/63 |
| DE | 112013006634 T5 | * | 10/2015 | G06F 13/10 |
| JP | 2009193106 A | | 8/2009 | |
| JP | 2012181876 A | * | 9/2012 | |
| WO | WO-9704384 A1 | * | 2/1997 | G06F 13/4256 |
| WO | WO-2013118195 A1 | * | 8/2013 | G06F 3/0604 |
| WO | WO-2016190893 A1 | * | 12/2016 | G06F 3/061 |
| WO | WO-2021174063 A1 | * | 9/2021 | H04L 67/1097 |
| WO | WO-2021174070 A1 | * | 9/2021 | G06F 9/4408 |
| WO | WO-2022132957 A1 | * | 6/2022 | G06F 11/1448 |
| WO | WO-2022140544 A1 | * | 6/2022 | G06F 21/575 |

* cited by examiner

CLOUD DEFINED STORAGE

BACKGROUND

Current enterprise class storage systems generally fall into two categories, external storage arrays or hyper-converged solutions. An external storage array, sometimes referred to as a disk array, is a data storage system containing dedicated storage hardware, e.g., hard disk drives (HDDs) or solid-state drives (SSDs). Current high-end external storage arrays commonly employ Fiber-Channel Storage Area Networks (SANS), while current lower-end external storage arrays commonly employ Internet Small Computer Interface (iSCSI) networks. Hyper-converged storage employs a software-defined approach to storage management that may combine storage, computing, virtualization, and sometimes networking technologies in one physical unit that is managed as a single system. All of these architectures have either high infrastructure cost (e.g., SAN setup) or impose high burdens on host processors, for example, in the form of a storage stack being run on the host processors.

Better storage solutions are desired.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

Figure 1:
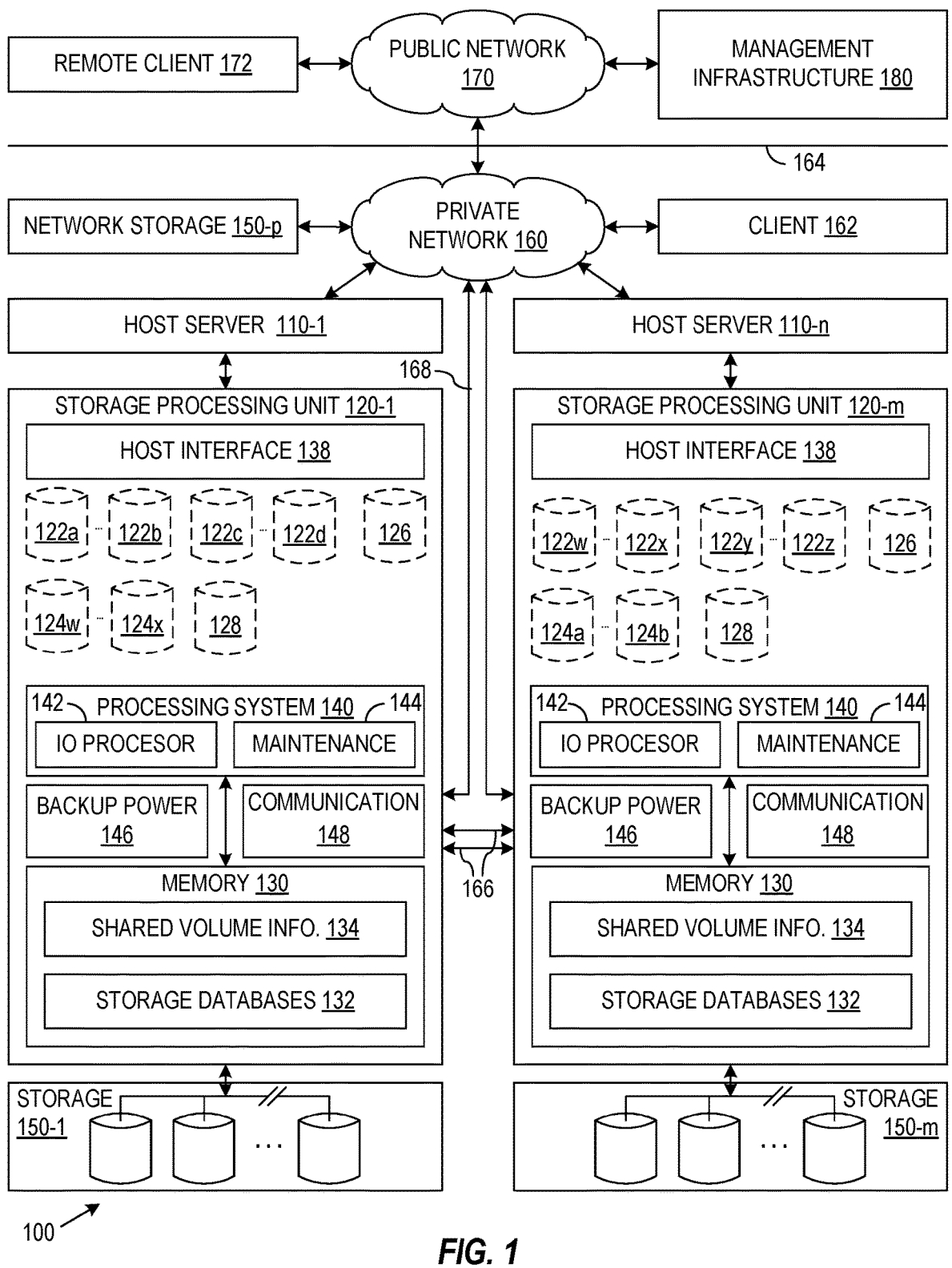
FIG. 1 is a block diagram illustrating an overall architecture including a storage platform in accordance with one example of the present disclosure.

In accordance with some examples of the present disclosure, one or more storage processing units (SPUs) with associated backend media may operate together to provide a data plane of a storage platform. Each SPU may be directly resident in a host system, e.g., a host server, and may avoid the infrastructure cost of setting up Fiber-Channel SANs. The SPUs may particularly provide networking capabilities so that dedicated (e.g., Ethernet-based) data links can be used for network redundancy and disaster recovery, and so that Cloud-based or local management resources may manage the SPUs. Unlike low-end RAID cards that some hosts employ, an SPU is able to provide disk fault-tolerance and continue to function even when the host OS or host CPU resets or crashes, or the host otherwise fails to provide power to the SPU. In particular, an SPU may employ fault-domain isolation with backup power that allows the SPU to continue operating, e.g., to conserve power, to place storage resources in a safe or recoverable state after the host system powered down, crashed, or reset, or to shift storage duties to other SPUs that may be fully powered.

Example implementations of the present disclosure may provide a storage platform that is robust and scalable across a large organization, i.e., provides enterprise class services, and may be more cost effective than external storage arrays or hyper-converged infrastructures. In an example implementation, the storage platform may employ a Cloud managed control plane and a Storage Processing Unit (SPU) enabled data plane. The SPUS may be implemented as Peripheral Component Interconnect Express (PCI-e) based storage engines with a multi-core System on Chip (SoC) for processing, and offload engines for security, encryption, and compression. The SPUs may execute processes that provides storage services such as deduplication, compression, snapshots, replication, multiple disk fault-tolerance, power failure tolerance, and disaster recovery support. In an exemplary implementation, an SPU plugs into the PCI-e bus of a host server and presents standard storage, e.g., Serial Attached SCSI (SAS) and/or Non-Volatile Express (NVME) storage, and is thus agnostic to the operating system (OS) or hypervisor running on the host and clients. Moving the control plane to the cloud may allow zero touch installation and software update capabilities, AI-powered automation at scale, built in fleet management, and rapid management software update capabilities.

The SPUs may communicate with Cloud-based facilities or infrastructure outside customer premises for management of the storage platform, but to enhance security, configuration changes of the storage platform may be limited to only being affected by clients inside a firewall for a private network of the enterprise that the storage platform serves. Alternatively or additionally, the SPUs may have dedicated security application specific integrated circuits (ASICs) or security modules used to generate and verify certificates and cryptographic signatures on any or all Cloud infrastructure, customer user interface (UI), and inter-SPU communications.

In some implementations, multiple SPUs may be grouped together to form a "Pod" that provides storage services on the set of hosts of a storage platform. SPUs within a Pod can maintain network redundancy relationships, such that a volume or LUN (Logical Unit Number) may be owned by one SPU, and backed up by a different SPU, while volumes or LUNs may be shared by and accessible to all SPUs in the Pod. In particular, any SPU receiving an IO request directed at a shared volume may directed the IO request to the SPU that owns the shared volume. The owner SPU may fulfill the IO requests and update IO operations, e.g., write operations, on a backup SPU, i.e., the SPU maintaining a backup volume for the volume the IO request targeted. The backup SPU can takeover and continue to provide access to the shared volume if the owner SPU fails or becomes inaccessible. Data for the IO requests may be transmitted between SPUs through a high speed data links.

Some volumes may be configured as "boot LUNs" that a host is able to use as a boot drive, and each host may boot off its associated boot LUN. Boot LUNs may be volumes that are owned by a single SPU and do not have a backup volume. Boot LUNs may also be volumes that are accessible only from the SPUs that own the volumes. One feature of the architecture is that for system configuration or updates, a manager, e.g., a cloud-based management system, can create a boot LUN image and direct one or more boot LUNs to be populated from the image. This may provide one-touch server installation, where a manager or other user creates a single image, and all targeted SPUs could automatically fetch the boot image, use the boot image to populate volumes that are the boot LUNs for their hosts, and enable the hosts to boot from their respective populated LUNs.

Storage systems as disclosed herein may provide many advantages over prior storage solutions. These advantages may include but are not limited to: 1. Less infrastructure cost for users due to avoidance of SAN setup; 2. No demands put on host CPUs for storage processing, enabling customer to have higher virtual machine (VM) density; 3. Fault domain isolation in a SPU so that the SPU can continue to serve data to other Pod members or place storage in a safe or recoverable state even if its local host is reset; 4. Boot LUNs can be auto-loaded upon provisioning; and 5. Cloud management, which provides advantages including advanced analytics, zero touch installation, and fast update cycles.

FIG. 1 is a block diagram of a system including a storage platform 100 in accordance with one example of the present disclosure. Storage platform 100 includes user hardware including one or more host servers 110-1 to 110-$n$, which are generically referred to herein as host servers 110. Each host server 110 may be a conventional computer or other computing system including a central processing unit (CPU), memory, and interfaces for connections to internal or external devices. One or more storage processing units (SPUs) 120-1 to 120-$m$, which are generically referred to herein as SPUs 120, are installed in host servers 110. In general, storage platform 100 may include one or more host servers 110, with each server 110 hosting one or more SPUs 120. A minimum configuration may include a single host server 110 in which one or more SPUs 120 resides. To improve redundancy, storage platform 100 may include at least two host servers 110 and at least at least two storage processing units 120, but more generally, a limitless number of different configurations are possible containing any number of host servers 110 and any number of SPUs 120. In general, storage platform 100 is scalable by adding more SPUs 120 with attached backend storage.

Each SPU 120 may provide storage services to host servers 110 and clients 162 or 172 via virtual volumes or LUNs 122. FIG. 1 particularly shows SPU 120-1 provides storage services relating to a set of virtual volumes 122$a$ to 122$b$ and 122$c$ to 122$d$, and shows SPU 120-$m$ provides storage services relating to virtual volumes 122$w$ to 122$x$ and 122$y$ to 122$z$. SPU 120-1 is sometimes referred to as "owning" volumes 122$a$ to 122$b$ and 122$c$ to 122$d$ in that SPU 120-1 is normally responsible for fulfilling IO requests that are directed at any of volumes 122$a$ to 122$b$ and 122$c$ to 122$d$. Similarly, SPU 120-$m$ is the owner of volumes 122-$w$ to 122-$x$ and 122$y$ to 122$z$ in that SPU 120-$m$ is normally responsible for executing IO requests that are directed at any of volumes 122-$w$ to 122$x$ and 122$y$ to 122$z$. The virtual volumes, e.g., volumes 122$a$ to 122$b$, 122$c$ to 122$d$, 122$w$ to 122$x$, and 122$y$ to 122$z$, are generically referred to herein as virtual volumes 122. Each volume 122 may be a "mirrored" volume with each mirrored volume having a backup volume 124 kept somewhere in storage platform 100. In FIG. 1, SPU 120-1 maintains backup volumes 124$w$ to 124$x$ that copy mirrored volumes 122$w$ to 122$x$ that SPU 120-$m$ owns, and SPU 120-$m$ maintains backup volumes 124$a$ to 124$b$ that copy virtual volumes 122$a$ to 122$b$ that SPU 120-1 owns. One or more backup volumes 124$a$ to 124$b$ and 124$w$ to 124$x$ of FIG. 1 are generically referred to herein as backup volumes 124. As described further below, backup volumes 124 may be virtual volumes that are copies of respective primary volumes 122. Volumes 122$c$ to 122$d$ and 122$y$ to 122$z$ are "unmirrored," meaning volumes 122$c$ to 122$d$ and 122$y$ to 122$z$ do not have associated backup volumes.

SPUs 120 may also maintain snapshots 126 of one or more volumes 122 or backup volumes 124 and may provide volumes 128 that are not available for shared data storage. Each snapshot 126 corresponds to data of a volume 122 or 124 at a time corresponding to the snapshot 126. Volumes 128 may include volumes that are only used by the host server 110, e.g., boot LUNs as described further below.

Each SPU 120 controls associated backend storage 150, e.g., storage 150-1 to 150-$m$, for storage of data corresponding to virtual volumes 122 that the SPU 120 owns and for backup volumes 124, snapshots 126 and unshared volume 128 that the SPU 120 maintains. In the example of FIG. 1, SPUs 120-1 operates storage 150-1 to store the data associated with primary volumes 122$a$ to 122$b$ and 122$c$ to 122$d$, backup volumes 124$w$ to 124$x$, and any snapshots 126 or volumes 128. SPUs 120-$m$ operates storage 150-$m$ to store the data associated with primary volumes 122$w$ to 122$x$ and 122$y$ to 122$z$, backup volumes 124$a$ to 124$b$, and any snapshots 126 or volumes 128. Each backend storage 150-1 to 150-$m$ may include one or more storage devices installed in the same host server 110 as the associated one of SPUs 120-1 to 120-$m$, one or more external storage devices directly connected to the associate SPU 120 or host 110, or network-connected storage 150-$p$. Backend storage 150 for an SPU 120 may employ, for example, hard disk drives, solid state drives, or other nonvolatile storage devices or media in which data may be physically stored, and storage 150 particularly may have a redundant array of independent disks (RAID) 5 or 6 configuration for performance and redundancy.

Each SPU 120 may be installed and fully resident in the chassis of its associated host server 110. Each SPU 120 may, for example, be implemented with a card, e.g., a PCI-e card, or printed circuit board with a connector or contacts that plug into a slot in a standard peripheral interface, e.g., a PCI bus in host server 110. Each SPU 120 may further be or include a device (e.g., a circuit board, multiple boards, a SoC, or an ASIC). In particular, each SPU 120 may connect to its host server 110 through an IO interconnect, which could be PCI-e bus, QuickPath interconnect (QPI) or equivalent front-side bus, or Gen-Z bus. FIG. 1 shows an example implementation of the present disclosure in which each SPU 120 includes a host interface 138 that is adapted or configured for connection to a host server 110. Host interfaces 138 are normally under the host's power, control and/or enumerations. Other core functions of SPUs 120, e.g., memory 130, processing system 140, and communication module 148, may be isolated from host servers 110 and connected to a backup power unit 146 that provides backup power to continue at least some operations of the SPU 120 regardless of state of its host 110, e.g., across host firmware upgrades, reset, and reboots of host servers 110. The isolated core functions of an SPU 120 may be implemented as on a separate add-in card (e.g., a PCIe card), on an add-in mezzanine card, or could be embedded directly on the motherboard of the server. A mezzanine card, also known as a "daughterboard," may be a VMEbus card, a CompactPCI card or a PCI card plugged into a board forming or including other portions of SPU 120.

Each SPU 120 includes memory 130 and a processing system 140 that may be parts of the isolated core of the SPU 120 and that are configured and used to provide the IO services of the SPU 120. As described further below, processing system 140 may include one or more processors to execute software or firmware needed to implement an IO processor 142 and a maintenance module 144. IO processor 142 may be used to process I/O requests such as reads and writes to primary volumes 122 owed by the SPU 120. In particular, IO processor 142 may perform single pass storage processing including, for example, hash calculations for deduplication, compression, encryption in single pass automatically on data coming into SPU 120. Maintenance module 144 may perform operations such as garbage collection to ensure that the associated physical storage 150 and other resources of the SPU 120 are efficiently used and maintained. During normal operation of each SPU 120, memory 130 and a processing system 140 may use power that the associated host server 110 provides and could use server-provided cooling, but in the event a host failure, memory 130 and a processing system 140 may receive from the backup power unit 146 in the SPU 120 power to maintain operation of the SPU 120 for a period of time after its host server 110 stops providing power, e.g., after the host server 110 loses power or otherwise powers down. Further, in addition to backup power 146, SPU 120 could also provide its own cooling to keep critical components cool in the case that the server does not provide cooling (i.e., when server does not have power or server cooling has failed). Accordingly, processing system 140 continues to operate and execute firmware, and memory 130, which may contain or operate nonvolatile storage such as non-volatile dual inline memory modules (NVDIMMs), phase change memory (PCM), or high endurance flash storage devices, remains accessible to processing system 140 for at least some period of time after the host server 110 powers down. Backup power unit 146 may further provide power to a communication module 148 to enable processing system 140 to communicate with other SPUs 120 and/or other devices using network communications. As described further below, an SPU 120 may thus execute a limited-power process or a safe power down process when its host unexpectedly power cycles or powers down.

Multiple SPUs 120, e.g., SPU 120-1 to 120-m in FIG. 1, may be connected together using high speed data links 166, e.g., one or more parallel 10, 25, 50, 100 or more GB/s Ethernet links, to form a data network for a pod of SPUs 120. Data links 166 may particularly form a high speed data network that directly interconnects the SPUs 120 in a pod and that is independent of a private network 160 connecting host servers 110 and clients 162.

Each SPU 120 may further employ a link 168 to connect to the local, private network 160 and through local network 160 and a firewall 164 connect to a public or wide area network 170, e.g., the Internet. In some implementations of storage platform 100, client stations 162 may communicate through a host 110 or through a link 168 to request storage services from an SPU 120. Each client station 162 may be a computer including a processor, memory, and software or firmware for executing a user interface adapted to communicate over local network 160. Client stations 162 in general may be storage clients that require storage services that storage platform 100 provides. FIG. 1 further shows that local network 160 may provide a connection through firewall 164 to public network 170, e.g., the Internet, so that SPUs 120 may be remotely accessed, for example, by a cloud-based management infrastructure 180, which is described further below. Additionally, some clients 172, which may also be storage clients, may connect through public network 170 to receive storage services from storage platform 100.

Cloud-based management infrastructure 180 may include a computer or server that is remotely located, e.g., to reduce the burden of storage management on an enterprise or offload the burden of storage management to experts such as manufacturers of the SPUs 120. Management infrastructure 180 may be used to manage SPUs 120, e.g., to configure SPUS 120, monitor performance of storage platform 100, or provide analysis services. In particular, management infrastructure 180 may configure each SPU 120 to create virtual volumes 122 that the SPU 120 owns, select which volumes 122 will be mirrored or unmirrored, assign backup volumes 124 to the SPU 120, or populate the content of volumes 128, e.g., boot volumes.

Figure 2:
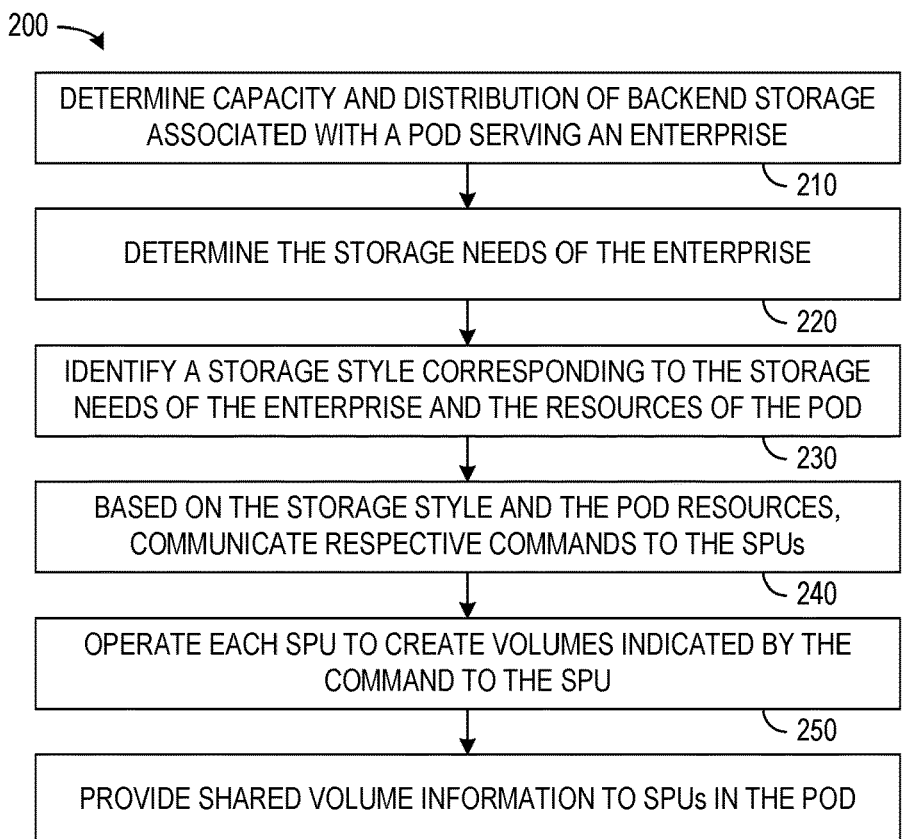
FIG. 2 is a flow diagram of a process for configuring a storage platform in accordance with one example of the present disclosure.

FIG. 2 is a flow diagram of an example process 200 for configuration of a storage platform such as storage platform 100 of FIG. 1. Process 200 begins in a process block 210 where a storage management system, e.g., Cloud-based management infrastructure 180, determines the storage capacity and distribution of storage in backend storage 150, e.g., all storage devices 150-1 to 150-m and 150-p, respectively associated with SPUs in a pod, e.g., the interlinked SPUs 120-1 to 120-m. The pod, in general, may serve the storage needs of an enterprise, e.g., a business government entity or any portion a business or government entity. Block 210 may be followed by or may precede a block 220.

In block 220, the storage management system determines the storage needs of the enterprise. For example, an employee of the enterprise may fill out a questionnaire or otherwise provide information regarding how much storage is needed and the level of security required for stored data. In another example, a local manager may use local management infrastructure, e.g., a client 162 on network 160, to inform remote management infrastructure 180 of a storage need or to request a change, e.g., addition of backend storage or a new SPU 120, in storage system 100. Block 220 may be followed by block 230.

In block 230, the storage management system identifies a storage style for the storage platform. The storage style selected or identified generally depends on storage services that the enterprise that the pod serves, e.g., clients 162 and 172 or the owners or users of host servers 110-1 to 110-n, require. In particular, some enterprises may need storage efficiency, e.g., a maximized capacity for data storage per byte of physical storage in backend storage 150. Other enterprises may prioritize the speed, availability, or fault tolerance of data services. For example, an unmirrored storage style may create primary volumes that are all or mostly unmirrored, i.e., volumes that do not have backup volumes. A unmirrored style may thus provide high storage efficiency, since physical storage is not required for backup data, but availability may be lower because backup volumes will not be available if the SPU that own a volume is unavailable. A single-access style may create primary volumes that are only available from the SPU that owns the volume or by or through the host that contains the SPU that owns the volume, while a shared style creates primary volumes on specific SPUs and permits SPUs that do not own a volume to contact and receive storage services from the SPU that owns the volume. In general, a single-access style may minimize complexity and maximize the speed or security of storage services, while a shared style permits operation of multiple host servers as access points for storage services. Table 1 lists some examples of storage styles for some combinations of mirror, unmirrored, shared, and single access features and indicates benefits of those styles. Block 230 may be followed by block 240.

TABLE 1

Storage Styles and Characteristics

| STYLE | HIGHLY AVAILABLE | MULTI-HOST ACCESS | EFFICIENCY |
|---|---|---|---|
| Single-access, unmirrored | No | No | High |
| Shared, unmirrored | No | Yes | High |
| Shared, mirrored | Yes | Yes | Low |

In blocks 240 and 250, the storage management system communicates with the SPUs in a pod, e.g., SPUs 120-1 to 120-m in FIG. 1, and directs the SPUs in the pod to create primary volumes 122, backup volumes 124, and unshared volumes 128. The storage management system may be or may include cloud-based storage management infrastructure, e.g., management infrastructure 180, that an entity separate from the enterprise operates. For example, a manufacturer of the SPUs or a data management service company having the storage system expertise may operate management infrastructure 180 to provide storage management services to the enterprise. In process block 240, a remote storage management system, e.g., storage management infrastructure 180 that is not within the firewall 164 of the enterprise's private network 160, communicates with SPUs 120 through the Internet and the enterprise's firewall 164 and private network 160. The communications of process block 240 may be secure, e.g., encrypted, communications respectively directed at the SPUs 120 in the pod, and each SPU 120 may have built-in security capable of decrypting or otherwise authenticating authorized communications targeted at that SPU 120. In response to authorized communications, an SPU 120 creates virtual volumes that the storage management system identified for that SPU 120, and the communications to all of the SPUs 120 in the pod collectively provide the storage system 100 with a configuration optimized for the enterprise. In general, the total number of volumes 122 owned by a particular SPU 120 and the backup volumes 124 maintained by the SPU 120 depend on the storage capacity of the backend storage 150 that the SPU 120 controls. Block 250 may be followed by a block 260.

In block 260, the storage management system provides all of the SPUs 120 in a pod with information on the primary volumes 122 or backup volumes 124 that are shared. Accordingly, if an SPU 120 receives an IO request targeting a shared volume 122 that the SPU 120 does not own, the SPU 120 can forward the IO request to the SPU 120 that owns the targeted volume. Data transfers between the SPUs 120 can be sent through the high speed data links, e.g., data links 166 in FIG. 1. After process block 260, volumes 122 may be available for storage services.

SPUs 120 may run a full storage stack without burdening host servers 110 and provide storage services and functionality such as persistent write-cache (implemented via battery, super cap, PCM type NVM or other flash technologies), erasure coding/RAID (redundant array of inexpensive disks), compression, deduplication, encryption, mirroring, remote and local access to data, disaster recovery and local and/or cloud backup. U.S. patent application Ser. No. 16/748,454, entitled "Efficient IO Processing in a Storage System with Instant Snapshot, Xcopy, and Unmap Capabilities," filed Jan. 21, 2020, and U.S. patent application Ser. No. 16/783,035, entitled "Primary Storage with Deduplication," filed Feb. 5, 2020 further describe some implementations of data services that SPU's 120 may provide and are hereby incorporated by reference in their entirety.

A pod of SPUs 120, in one specific implementation of the present disclosure, provides an interface that exposes the virtual volumes 122, as described above, to storage operations such as writing and reading of blocks or pages of data at virtual locations in volumes 122. SPUs 120 may present storage volumes 122 to host servers 110 via SCSI (small computer system interface) target, NVMe (nonvolatile memory express) virtual target, or other data interface. The locally installed storage 150 may provide the physical storage of data patterns of data written to virtual volumes 122. As previously noted, storage 150 may include storage devices, e.g., HDDs, SSDs or NVM, installed in the host server 110, connected through an interface of the host server 110, or connected directly to the SPU 120. Physical storage for volumes 122 could alternatively be created on storage devices 150-p accessed through local network 160 or SPUs 120 in other host servers 110. In some implementations, storage 150 is only visible to SPUs 120, and the SPUs 120 present only virtual volumes 122 to hosts 110 and clients 162. In particular, the CPUs, OS, firmware, and baseboard management controllers (BMCs) of host servers 110 may not able to see or directly access some or all of storage 150. Host servers 110 and clients 162 may instead request storage services on the virtual volumes 122 owned by SPUs 120.

Each SPU 120 may be configured for use with a standard or in-box OS driver to provide its host server 110 with storage services. For example, in some possible instantiation, an SPU 120 could appear to its host 110 be a Serial Attached SCSI (SAS) device or a FC IOC (fiber channel I/O controller) device, or in another instantiation, an SPU 120 could emulate Non-Volatile Memory Express (NVMe) target. Such configurations avoid the need for custom driver installation on the hosts 110 to enable storage platform 100. The use readily available drivers could lower the cost of storage platform 100 and simplify driver updates.

Storage services implemented in platform 100 include execution of IO requests such as reads and writes. A read or write may identify a storage location by a volume number or volume ID of a virtual volume 122 and an offset to a starting location of data in the identified virtual volume 122. A client 162 may send an IO request, e.g., a read or write request, to an SPU 120 or a server 110. If the volume 122 is a single access volume, the IO request must be sent to the SPU 120 that owns the volume or the host 110 of the SPU 120 that owns the volume 122. For shared volumes, each SPU 120 may maintain a table 134 tracking the owners of all active shared volumes 122, so that the SPU 120 that initially receives an IO request may direct the IO request to the SPU 120 that owns the volume 122 targeted by the IO request. Each SPU 120 may also use shared volume information 134 to track which SPUs 120 maintain backup volumes 124, and ether the SPU 120 that initially receives a write request or the SPU 120 that owns the targeted volume may forward at least some IO requests, e.g., write requests, to the SPU 120 backing up the volume targeted by the IO request. The SPU 120 that owns the virtual volume 122 targeted by an IO request can process the IO request. In particular, each SPU 120 maintains one or more databases 132 in memory 130 to track the physical locations in storage 150 storing data patterns that correspond to virtual storage locations, e.g., combinations of a virtual volume ID and offset, in owned volumes 122 and maintained backup volumes 124. I/O processor 142 and maintenance module 144 may share and maintain databases 132 in memory 130 to provide IO services. I/O processor 142 may, for example, update database 132 during write operations to record a mapping from virtual storage locations in virtual volumes 122 to physical storage locations, e.g., in backend storage 150. I/O processor 142 may also use the mapping from databases 132 during a read operation to identify where a data pattern in a virtual volume 122 is stored in backend storage 150. Database 132 may additionally include deduplication signatures for the pages in the virtual volumes 122, and the deduplication signatures may be used for deduplication or garbage collection. Databases 132 may include any type of database but in one example databases 132 use a key-value database including a set of entries that are key-value pairs including a key identifying a particular version of a virtual storage location in a virtual volume 122, a backup volume 124, or a snapshot 126 and a value indicating a physical location containing the data corresponding to the virtual storage location. Above-incorporated U.S. patent application Ser. No. 16/748,454 and U.S. patent application Ser. No. 16/783,035 describe further details of some example implementations of storage systems providing accessible virtual volumes and using databases and physical storage media.

Figure 3:
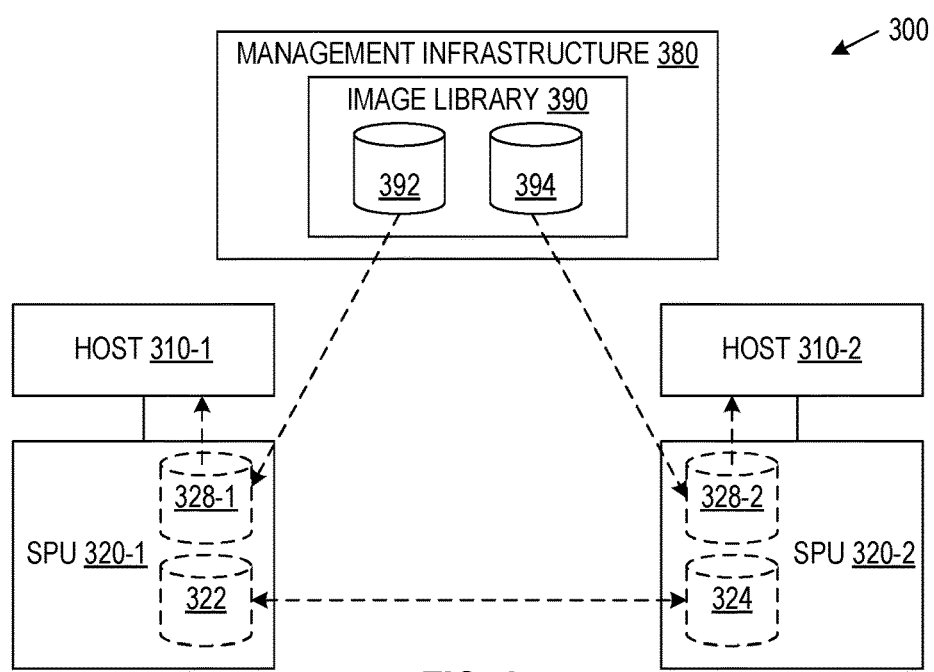
FIG. 3 is a block diagram illustrating a storage platform in accordance with one example of the present disclosure providing one-touch server installation and updates.

In addition to configuring volumes 122 that are available for storage services, management infrastructure 180 can be used to create boot volumes for hosts 110. FIG. 3 illustrates a storage platform 300 having a data plane provided by a POD including SPUs 320-1 and 320-2 respectively in hosts 310-1 and 310-2. In one implementation, hosts 310-1 and 310-2 and SPUs 320-1 and 320-2 may be similar or identical to the host servers 110 and storage processing units 120 described above with reference to FIG. 1. Each SPU 320-1 or 320-2 typically owns zero, one, or multiple shared or unshared volumes and maintains zero, one, or multiple shared backup volumes. In the illustrated example, SPU 320-1 owns a shared volume 322 and SPU-2 maintains a backup volume 324 for shared volume 322. SPU 320-1 also provides a volume 328-1 that is configured as a boot LUN for host 310-1. In particular, host 310-1 is able to use volume 328-1 as a boot drive, and host 320-1 may use boot LUN 328-1 when booting. Similarly, SPU 320-2 also provides a volume 328-2 that is configured as a boot LUN for host 310-2, and host 310-2 is able to use volume 328-2 as a boot drive. Boot LUNs 328-1 and 328-2 generally do not require or have a backup volume, and boot LUNs 328-1 and 328-2 do not need to be (and generally are not) shared. In particular, boot LUNs 328-1 and 328-2 may be volumes that are accessible only from respective SPUs 320-1 and 320-2 by respective hosts 310-1 and 310-1.

FIG. 3 further illustrates management infrastructure 380. Management infrastructure 380 may include a computer system. In one implementation, management infrastructure 380 may be a remote system similar or identical to Cloud-based management infrastructure 180 of FIG. 1 and may communicate with storage platform 300 through the Internet. Alternatively, management infrastructure 380 may be directly connected to the local or private network (not shown) also connected to SPUs 320-1 and 320-2. Management infrastructure 380 includes an image library 390 containing boot LUN images 392 and 394. One feature of storage platform 300, a manager or other user of management infrastructure 380 can create a boot LUN image 392 or 394 and direct SPUs, e.g. SPU 320-1 and 320-2, populate their owned boot LUNs, e.g., boot LUNs 328-1 and 328-2, from specified images 392 or 394. For example, SPUs for all hosts running a specific operating system, e.g., a specific version of Linux or Microsoft Windows®, may be directed to pre-populate their boot LUNs by copying from image library 390 the image corresponding to the specific operating system. In the implementation of FIG. 3, SPU 320-1 may copy image 392, which may be for hosts running a particular version of Microsoft Windows®, to boot LUN 328-1, and SPU 320-2 may copy image 394, which may be for hosts running particular version of Linux, to boot LUN 328-2. Only host 310-1, which is connected to SPU 320-1, sees or uses volume 328-1 as a boot volume. Similarly, only host 310-2, which connects to SPU 320-2, sees or uses volume 328-2, which SPU 320-2 pre-populated with image 394. Storage platform 300 can thus provide a one-touch server installation and updates to host servers, where a manager or other user creates a new boot image in image library 390 and then reboots the servers containing SPUs that download the new image for the SPUs' hosts.

Figure 4:
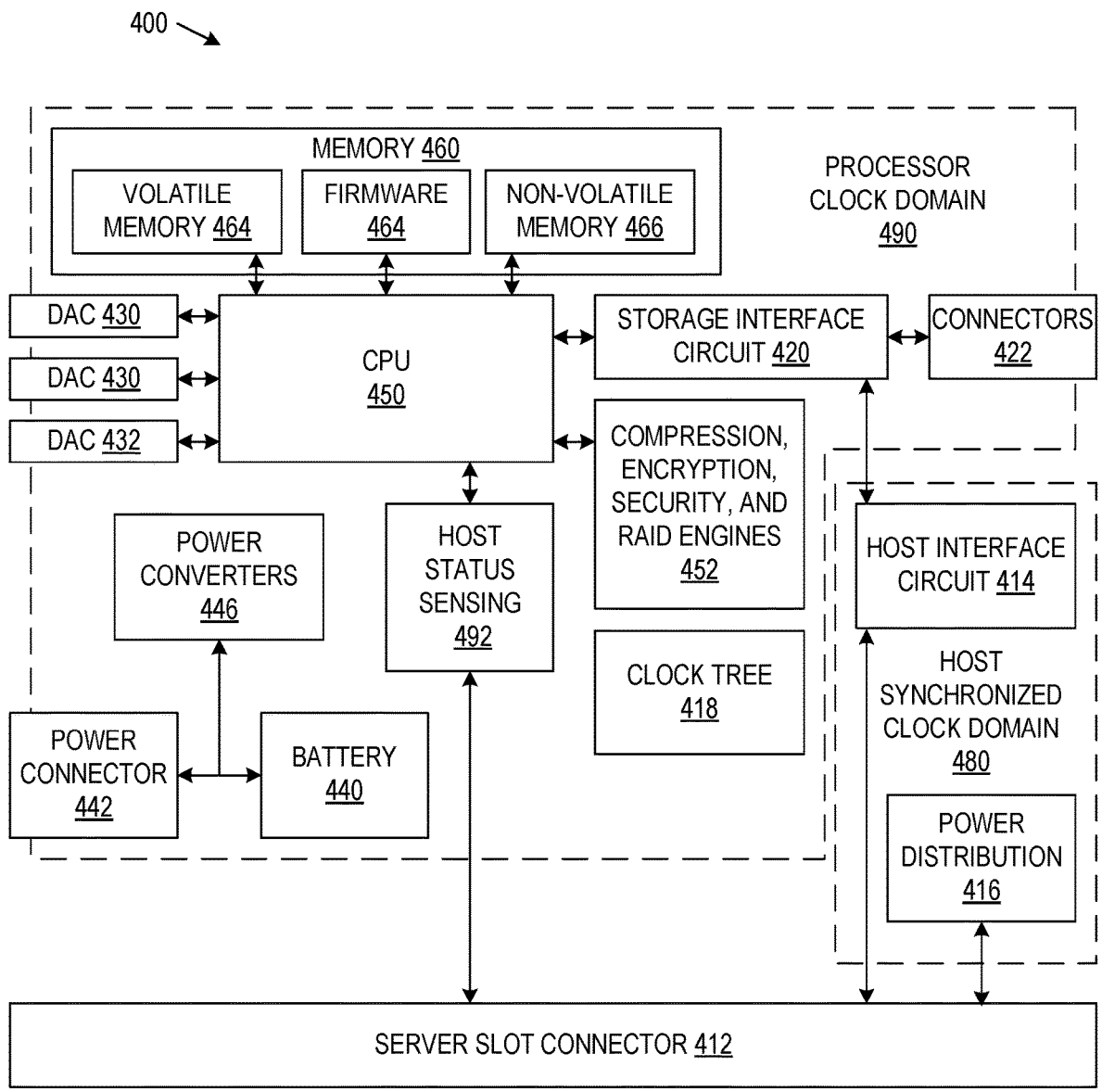
FIG. 4 is a block diagram illustrating a storage processing unit in accordance with one example of the present disclosure.

FIG. 4 is a block diagram illustrating an SPU 400 in accordance with one example of the present disclosure. SPU 400 may be similar or identical to the SPUs that are described above with reference to FIGS. 1 and 3. SPU 400 has four main functional interfaces including a host interface to the host server, a storage interface to local storage, data network interface for communication with other SPUs in a Pod, and network interface for connection to the Cloud.

The host interface in the example of FIG. 4 includes a server slot connector 412 configured to plug into a slot of the host server, a host interface circuit 414 configured to implement protocols required by the host, and a power distribution circuit 416 that receives power from the host via connector 412 and distributes power to components of SPU 400 during host-powered operation. Host interface circuit 414 may, for example, be a controller that enables operation of SPU 400 as a PCIe, SAS or SATA storage device for the host. Host interface circuit 414 is on or part of a host server reset/clock domain 480, while the rest of SPU 400 is on an isolated processor clock domain 490. Both host interface circuit 414 and the rest of SPU 400 may be parts of the same power tree but are on different domains to allow SPU domain 490 to survive power cycles, server resets, crashes, and other events in which the host stops providing power. A clock tree 418 distributes clock signals including a clock signal for a domain 480 that includes host interface circuit 414 and may be synchronized with the host connection. Clock tree 418 also distributes a clock signal for processor domain 490 that includes a processing core or CPU 450 that is capable of continuing operation of portions of SPU 400 when the host has failed, powered down, or otherwise stopped providing power or communication to SPU 400.

The storage interface of SPU 400 includes a storage interface circuit 420 and connectors 422 for connection to local storage, e.g., backend storage. Storage interface circuit 420 may be a controller that enables operation of connected backend storage as a PCIe, SAS or SATA storage device for SPU 400. Storage interface circuit 420, as illustrated in FIG. 4, may operate across the processor clock domain 490 and the host synchronized clock domain 480 when the host has a normal operating status. Storage interface circuit 420 may operate in the SPU clock domain 490 when the operating status of the host is not normal.

The data network interface of SPU 400 is for communication with other SPUs. The data network interface may particularly be used for write mirroring and remote access to data and may employ converters or adaptors 430 implementing high speed connections. For example, adaptors 430 may provide dual Ethernet (could be two 25/100 GbE) ports, Infiniband, fiber channel, or other high data rate connections to other SPUs. The network interface for communication between SPU 400 and the cloud similarly employs a converter or adaptor 432 implementing a conventional communication protocol, e.g., a 1 or 10 Gb Ethernet interface or a wireless communication protocol such as WiFi.

Processor clock domain 490 in the implementation of FIG. 4 includes CPU 450 and processing engines 452, which could be components of a System-on-Chip (SoC). CPU 450, which may include one or more processing cores, may provide general purpose processing, while processing engines 452 provide special purpose computing optimized for processes such as encryption and other security functions, compression, and RAID offloads. Processor clock domain 490 further includes CPU memory 460, which includes volatile memory 462, e.g., DDR4 memory, firmware memory 464, and non-volatile memory 466 for persistent data. Volatile memory 462 may be employed for general processing purposes, while firmware memory 464 may particularly store firmware for functional modules implementing error logging, fault recovery, boot processes, shutdown processes, and other procedures implemented or executed by CPU 450. Non-volatile memory 466 may be used for data, e.g., databases 132, 134, and 136 shown in FIG. 1, that SPU 400 needs to persist when SPU 400 powers down SPU 400 may operate, as described above, using power from the host when the operating status of the host is normal. SPU 400 may additionally or alternatively use a battery 440, a power connector 442, and power converters 446 to provide power throughout processor clock domain 480. Battery 440 may include one or more rechargeable batteries, e.g., lithium batteries, a super capacitor, or event a persistent memory such as an Intel Optane device. Power connector 442 may be connected to a power source other than the host server slot. For example, a power source such as a PCI auxiliary power connector may be connected to power connector 442. In general, SPU 400 may operate using power from battery 440 or received through power connector 442 regardless of the status of the host, and in some implementations, SPU 400 may use power from battery 440 or connector 442 to operate for an extended period of time (at least long enough to complete a safe shutdown process) without requiring power received through server slot connector 412. Battery 440 alone may provide power to SPU 400 when both host connector 412 and power connector 442 fail to provide power. In general, battery 440 may be sufficient to power clock domain 490 long enough for CPU 450 to execute the safe shutdown process or a "limited power" process. For example, data in volatile RAM 464 or even non-volatile RAM 466 may be saved to physical storage, e.g., a disk or other physical storage connected through storage interface circuit 420. This is data may include write data that SPU 400 acknowledged to the host but has not yet written to physical storage. The saved data may also include any metadata changes that have not been written to physical storage. More generally, SPU 400 may perform a limited power process that depends on the extent of the power loss. For brief losses, such as brown outs, SPU 400 may conserve power and continue limited or normal operation until full power resumes. For an extended power loss, SPU 400 might save data, instruct the SPUs maintaining backup volumes of volumes that the shutting down SPU to become owners of those volumes, and shutdown.

A host status sensing circuit 492 connects to server slot connector 126, senses the status of the host, and signals the status to CPU 450. In one configuration, sensing circuit 492 senses a power status the host, a temperature status of the host, and a pressed status of an external reset button, and sensing circuit 492 notifies CPU 450, i.e., provides the status data for use in software or firmware that CPU 450 executes.

Status sensing circuit 492 may be a Field Programmable Gate Array (FPGA) that is configured according to the type of connection used between SPU 400 and the host. CPU 450 can be triggered to perform specific processes, e.g., the shutdown process or limited power process described above, in response to the status of the host and the status of power received through power connector 442.

Each of modules disclosed herein may include, for example, hardware devices including electronic circuitry for implementing the functionality described herein. In addition or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A process for configuring a storage platform including a plurality of storage processing units that are resident in one or more host servers of an enterprise, the process comprising:
   cloud-based management infrastructure determining characteristics of backend storage that is connected to the storage processing units;
   selecting based on storage needs of the enterprise a storage style for the storage platform; and
   the cloud-based management infrastructure directing the storage processing units to create a plurality of virtual volumes that the storage platform presents for storage services, the cloud-based management system selecting one or more characteristics of the virtual volumes based on the storage style selected, wherein
   the characteristics of each of the virtual volumes include whether the virtual volume is accessible using any of the storage processing units or accessible only through one of the storage processing units and whether the virtual volume has a backup volume implemented by the storage processing units.

2. The process of claim 1, wherein the cloud-based management infrastructure directing the storage processing units to create the virtual volumes comprises the cloud-based management infrastructure communicating over the internet commands that direct the storage processing units to create the virtual volumes.

3. The process of claim 1, wherein the cloud-based management infrastructure determining the characteristics of the backend storage comprises determining capacity and distribution of the backend storage at the enterprise.

4. The process of claim 1, wherein selecting the storage style comprises:
   a representative of the enterprise providing to the cloud-based management information indicating priorities or requirements of the enterprise; and the cloud-based management infrastructure selecting the storage style based on the information and on the characteristics of the backend storage.

5. The process of claim 4, wherein the priorities or requirements include one or more of speed, availability, or fault tolerance of data services, storage capacity of the storage platform, and a security level for stored data, and data.

6. The process of claim 1, wherein the virtual volumes comprise a plurality of primary volumes and any number of backup volumes, the backup volumes mirroring associated ones of the primary volumes.

7. A process for configuring a storage platform including a plurality of storage processing units that are resident in one or more host servers of an enterprise, the process comprising:
   cloud-based management infrastructure determining characteristics of backend storage that is connected to the storage processing units;
   selecting based on storage needs of the enterprise a storage style for the storage platform; and
   the cloud-based management infrastructure directing the storage processing units to create a plurality of virtual volumes that the storage platform presents for storage services, the cloud-based management system selecting one or more characteristics of the virtual volumes based on the storage style selected, wherein
   the virtual volumes comprise a plurality of primary volumes and any number of backup volumes, the backup volumes mirroring associated ones of the primary volumes, and wherein
   selecting the storage style comprises selecting from among:
   an unmirrored storage style in which the primary volumes are all or mostly unmirrored;
   a single-access style in which each of the primary volumes is only available through the storage processing unit that owns the primary volume; and
   a shared style in which each of the primary volumes is available through the storage processing unit that owns the primary volume and through one or more of the storage processing units that do not own the primary volumes.

8. A process for configuring a storage platform including a plurality of storage processing units that are resident in one or more host servers of an enterprise, the process comprising:
   cloud-based management infrastructure determining characteristics of backend storage that is connected to the storage processing units;
   selecting based on storage needs of the enterprise a storage style for the storage platform;
   the cloud-based management infrastructure directing the storage processing units to create a plurality of virtual volumes that the storage platform presents for storage services, the cloud-based management system selecting one or more characteristics of the virtual volumes based on the storage style selected, the virtual volumes including a plurality of primary volumes and any number of backup volumes, the backup volumes mirroring associated ones of the primary volumes; and
   the cloud-based management infrastructure providing the storage processing units with information on the primary volumes and the backup volumes that are shared across the storage platform.

9. The process of claim 7, wherein the cloud-based management infrastructure directing the storage processing units to create the virtual volumes comprises the cloud-based management infrastructure communicating commands that direct the storage processing units to create the virtual volumes, the commands being communicated through a public network to a private network at the enterprise and through the private network to the storage processing units.

10. The process of claim 8, wherein the cloud-based management infrastructure directing the storage processing units to create the virtual volumes comprises the cloud-based management infrastructure communicating commands that direct the storage processing units to create the virtual volumes, the commands being communicated through a public network to a private network at the enterprise and through the private network to the storage processing units.

* * * * *